United States Patent
Lacko (10) Patent No.: US 10,167,741 B2
(45) Date of Patent: Jan. 1, 2019

(54) NACELLE FLUID DRAIN

(71) Applicant: ROHR, INC., Chula Vista, CA (US)

(72) Inventor: Anthony Lacko, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 584 days.

(21) Appl. No.: 14/931,477

(22) Filed: Nov. 3, 2015

(65) Prior Publication Data

US 2017/0122128 A1 May 4, 2017

(51) Int. Cl.
*F01D 25/32* (2006.01)
*F01D 11/02* (2006.01)
*F01D 25/24* (2006.01)
*B64C 1/14* (2006.01)
*B64D 29/00* (2006.01)

(52) U.S. Cl.
CPC .......... *F01D 25/32* (2013.01); *B64C 1/1453* (2013.01); *B64D 29/00* (2013.01); *F01D 11/02* (2013.01); *F01D 25/24* (2013.01); *F05D 2220/36* (2013.01); *F05D 2240/55* (2013.01)

(58) Field of Classification Search
CPC .. F02C 7/30; B64D 29/00; B64C 1/14; B64C 1/16; F02K 3/02; F02K 3/04; F02K 3/06; F23R 3/60; F23R 2900/00012; F01D 25/24; F01D 25/32
See application file for complete search history.

(56) References Cited

U.S. PATENT DOCUMENTS

| | | | | |
|---|---|---|---|---|
| 2,949,736 | A * | 8/1960 | Rubbra | F23R 3/60 60/39.094 |
| 3,371,482 | A * | 3/1968 | Camboulive | F02C 7/232 60/39.094 |
| 3,556,444 | A * | 1/1971 | Kopp | B64C 29/0091 222/108 |
| 4,163,366 | A * | 8/1979 | Kent | F02C 7/25 60/226.1 |
| 5,211,535 | A | 5/1993 | Martin | |
| 5,910,094 | A | 6/1999 | Kraft et al. | |
| 9,718,531 | B2 * | 8/2017 | Gaudreau | B64C 1/1453 |
| 2012/0181359 | A1 * | 7/2012 | Welch | B64D 29/00 239/589 |
| 2013/0327059 | A1 * | 12/2013 | Richardson | B64C 1/1453 60/797 |
| 2015/0136875 | A1 | 5/2015 | Lacko | |
| 2015/0143796 | A1 | 5/2015 | Lacko | |

FOREIGN PATENT DOCUMENTS

EP 2642081 9/2013
GB 1147345 4/1969

* cited by examiner

Primary Examiner — Justin Seabe
(74) Attorney, Agent, or Firm — Snell & Wilmer, L.L.P.

(57) ABSTRACT

An aircraft nacelle may comprise an inner fixed structure and an outer sleeve. The aircraft nacelle may comprise an O-duct thrust reverser. A drain gutter may be located in the inner fixed structure. The drain gutter may comprise a labyrinth configuration. The drain gutter may drain fluids in an aft direction through the inner fixed structure. The fluids may exit through a drain fin located at a station plane aft of the outer sleeve.

20 Claims, 11 Drawing Sheets

NACELLE FLUID DRAIN

FIELD

The present disclosure relates to an aircraft engine nacelle, and more particularly, to fluid drainage in such a nacelle.

BACKGROUND

A nacelle for a turbofan propulsion system on a typical commercial airliner is structure which surrounds the engine providing smooth aerodynamic surfaces for airflow around and into the engine. The nacelle also helps define a bypass air duct through the propulsion system. The nacelle may also include a thrust reverser which can deploy and provide reverse thrust to help slow the aircraft after touchdown. Part of the nacelle is an aerodynamic cowl that surrounds the engine core aft of the fan, and forms the radial interior surface of the bypass air duct. If forms a generally enclosed space around the core of the engine called the core compartment. If this core-surrounding cowl is part of a cascade-type thrust reverser, it is often called an inner fixed structure (IFS). Flammable fluids may leak from the engine onto the inside of this cowl in the core compartment and be trapped and collect there. Normally, a fluid drain system is provided to guide any leaked fluid out of the core compartment and outside of the propulsion system. Bifurcations that bifurcate the bypass air duct are normally used at the 6 o'clock and 12 o'clock positions so that various systems (hydraulic fluid, fuel, cabin air, etc.) have physical access between the engine core and the rest of the nacelle and aircraft. The fluid drain system is typically positioned inside of the six o'clock or lower bifurcation. In increasingly many new nacelle system designs, elimination of the lower bifurcation is proposed. When the lower bifurcation is eliminated, a new type of fluid drain system is needed.

SUMMARY

An aircraft engine nacelle comprising an outer sleeve; and an inner fixed structure surrounding a portion of an engine and helping to define a core compartment, the outer sleeve and the inner fixed structure defining between them a bypass air duct; the inner fixed structure comprising a gutter, the gutter configured to drain fluids in an aft direction through the inner fixed structure and exit at a location aft of the bypass air duct.

The gutter may comprise a labyrinth structure. The gutter may comprise a drain fin coupled to an outer surface of the inner fixed structure and located aft of the outer sleeve. The aircraft engine nacelle may comprise a drain fin located at a position of lower gravitational potential energy than the gutter. The aircraft engine nacelle may comprise a fire seal formed by a left half of the inner fixed structure and a right half of the inner fixed structure. The aircraft engine nacelle may comprise a siphon located in the inner fixed structure and comprising an orifice in an outer surface of the inner fixed structure. The siphon may comprise a tube configured to transfer air from a bypass duct to an exit of the gutter.

A drain gutter for an aircraft nacelle may comprise a first inner fixed structure ("IFS") half; and a second IFS half, wherein the first IFS half and the second IFS half form a gutter where the first IFS half and the second IFS half couple together.

The gutter may be a labyrinth gutter comprising an upper channel and a lower channel separated by a separation platform. The first IFS half and the second IFS half may form a fire seal adjacent to the lower channel. The labyrinth gutter may be configured to prevent ignition of fluids in the lower channel. The drain gutter may comprise a vacuum tube fluidly coupled to the gutter. The drain gutter may comprise a drain fin coupled to the first IFS half. The drain gutter may comprise a compressor drain tube, a combustor drain tube, and a turbine drain tube configured to drain fluids into the gutter.

An aircraft nacelle may comprise an inner fixed structure, a translating sleeve, and a drain gutter located within the inner fixed structure, wherein the drain gutter comprises a drain fin located aft of the translating sleeve, wherein the drain gutter is configured to drain fluids in an aft direction through the inner fixed structure to the drain fin. The aircraft nacelle may comprise a siphon in the inner fixed structure. The siphon may be fluidly coupled to the drain gutter. The siphon may comprise an orifice in an outer surface of the inner fixed structure. A communal collector may be configured to receive fluids from at least one of a compressor, a combustor, or a turbine. An air pressure in the siphon may be less than an air pressure in the drain gutter. A fluid path in the drain gutter may be configured to be gravitationally downhill when the aircraft nacelle is in level flight.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
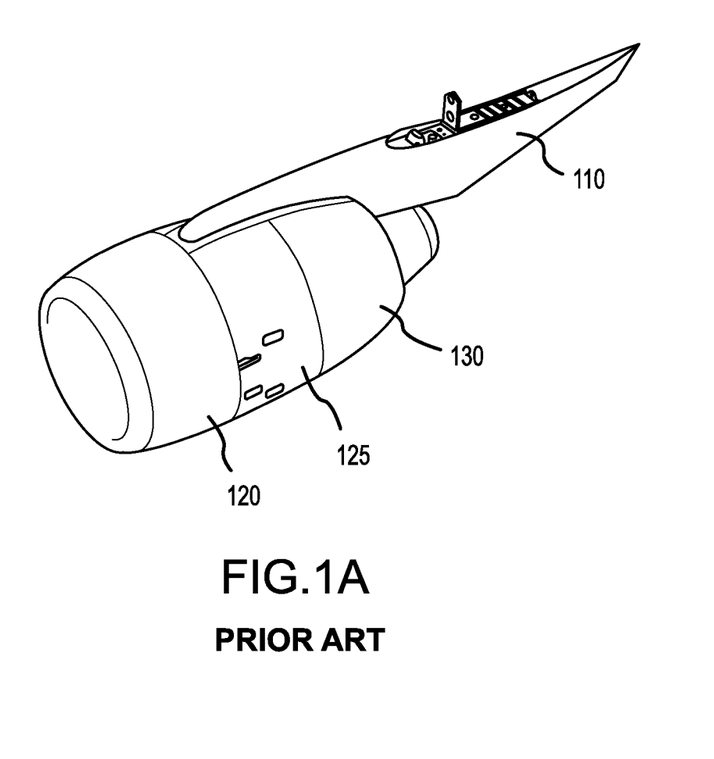
FIGS. 1A-1B depict a typical propulsion system and its elements.
Figure 1B:
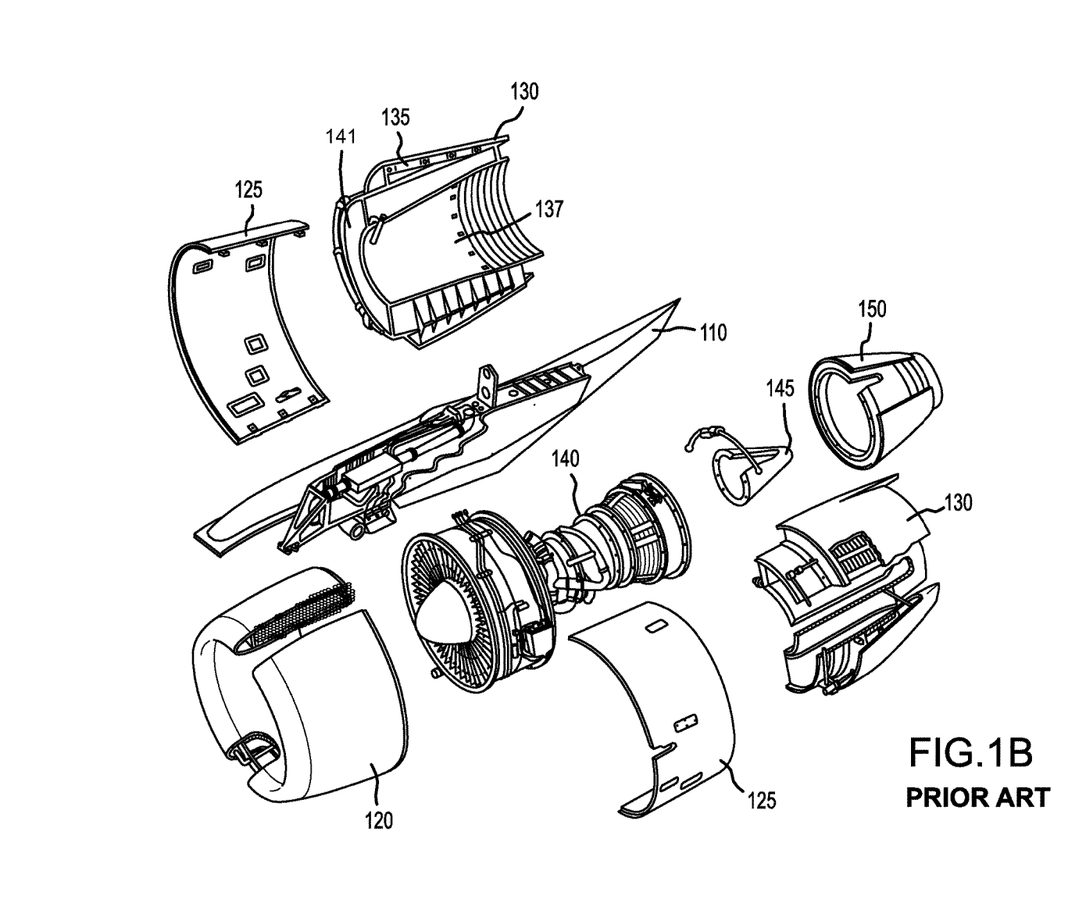

As depicted in FIGS. 1A and 1B, a typical turbofan propulsion system for a commercial jetliner may include an engine 140, pylon 110, and nacelle package. The typical nacelle package, or more simply a nacelle, may comprise an inlet 120, a fan cowl 125, a thrust reverser 130, and an exhaust system including an exhaust cone 145, and exhaust nozzle 150. The nacelle surrounds the engine providing smooth aerodynamic surfaces for airflow around and into the engine. The nacelle also helps define a bypass air duct through the propulsion system.

A fan draws and directs a flow of air into and through the propulsion system. After the fan, the air is divided into two principal flow paths, one flow path through the engine core, and another flow path through a bypass air duct. The engine core flow path is directed into the engine core and initially passes through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle 150 at the rear of the engine 140 for thrust.

Figure 2A:
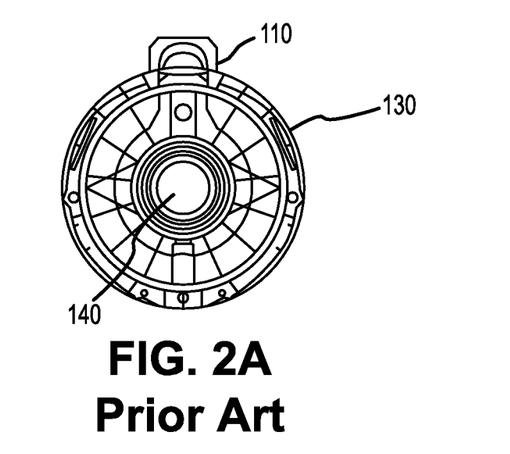
FIGS. 2A-2B are rear views of a typical propulsion system and depict the open (for engine access and maintenance) and closed positions of the thrust reverser.
Figure 2B:
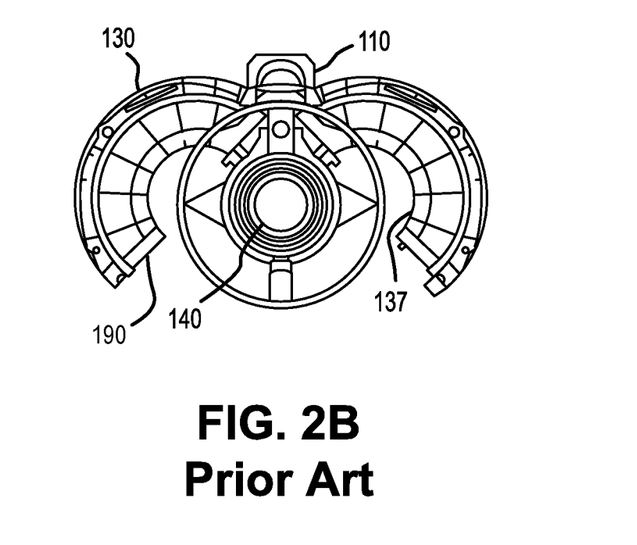

The bypass air flow path includes air from the fan that is directed around the engine core in a duct or ducts defined by the nacelle. The bypass air exits the duct at a bypass air nozzle formed by the thrust reverser between inner fixed structure 137 and outer sleeve 135. In turbofan engines, the bypass flow typically provides a large percentage of the thrust for an aircraft. The bypass air ducts in the nacelle in FIGS. 1-2 are C-shaped, and are principally defined by the exterior surface of the inner fixed structure 137 and the inside surface 141 of the outer sleeve 135. If the nacelle includes a typical thrust reverser 130, the thrust reverser 130 selectively blocks bypass air in the bypass air duct from reaching its normal exit, and instead redirects the bypass air to exit the duct in a forward direction of the aircraft to generate reverse thrust.

The thrust reverser 130 may comprise two halves generally configured to surround the engine core. The thrust reverser 130 may be hinged to the pylon 110 via one or more hinges. This typical hinged attachment and relative hinging motion is depicted in FIGS. 2A-2B. The thrust reverser 130 comprises an inner fixed structure 137 and an outer sleeve 135. The inner fixed structure 137 generally surrounds the engine core and helps define the core compartment. As used herein, the outer sleeve, though it may have any shape, may generally be a C-shaped structure. The two halves of the thrust reverser 130 may be separated at the 6 o'clock position by lower bifurcation panels 190. An interior surface of the outer sleeve 135, along with the IFS 137, partially defines the bypass air duct or cold flow path of the propulsion system of the aircraft. The inner fixed structure 137 and the outer sleeve 135 are typically coupled together and attached to the pylon 110 via the same hinges in a translating sleeve, cascade-style thrust reverser. As used herein, the IFS is generally referred to in the singular; however it should be appreciated that an IFS may actually constitute two or more separate IFS halves that join together to form the enclosure around the engine core and may move or hinge open in order to permit engine access. Furthermore, while IFS is a label typically used to refer to the style of aerodynamic fairing depicted in FIGS. 1 and 2 that forms part of the cascade-style thrust reverser, we use IFS herein to mean any type of aerodynamic fairing which generally surrounds the engine core and helps define the core compartment. The IFS is "fixed" only in the sense that it typically does not move out of place when the thrust reverser deploys, but it may move (hinge, slide, etc.) in order to provide engine access.

Figure 3:
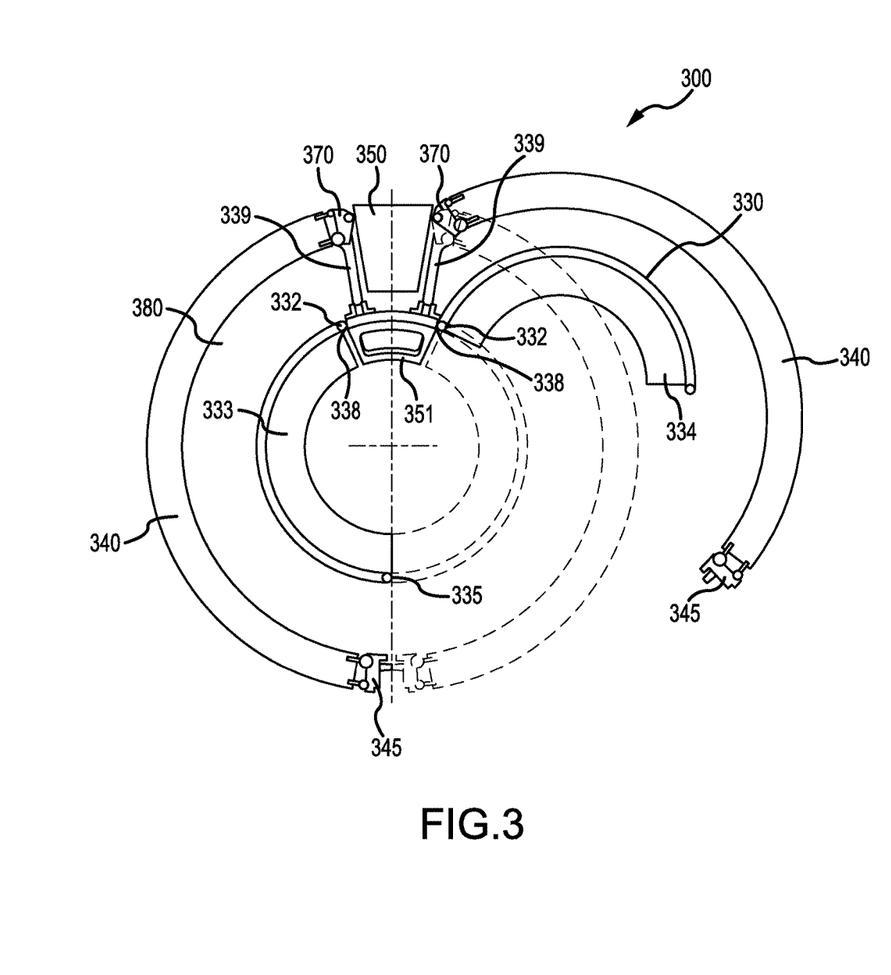
FIG. 3 illustrates a cross-section view of an O-duct thrust reverser in accordance with various embodiments.

Referring to FIG. 3, a cross-section view of an O-duct thrust reverser 300 is illustrated according to various embodiments. The thrust reverser is called an O-duct thrust reverser because there are no lower bifurcation panels to form a lower bifurcation between the IFS 330 and the outer sleeve 340. The IFS 330 and outer sleeve 340 may be separately coupled to a pylon 350. For instance, the inner fixed structure 330 and outer sleeve 340 may be hinged separately and attached to different parts and/or locations of pylon 350 or hinge beam 351. These hinge locations may comprise non-coaxial and generally parallel axes of rotation. For instance, outer sleeve 340 may be hinged, via one or more hinges 370 to pylon 350. The halves of the outer sleeve 340 may couple together by latches 345. Inner fixed structure 330 may be hinged to the hinge beam 351 or other fixed structure via one or more hinges 332. Fire seals 338 may be present at the hinge locations to create a sealed fire chamber around the engine core. The O-duct thrust reverser 300 may further comprise upper bifurcation panels 339. The outer sleeve 340 and the IFS 330 may together form the bypass air duct 380. A drain gutter may be present where the left IFS 333 and the right IFS 334 couple together at the bottom 335 of the IFS 330. Latches may also be present near the bottom 335 of the left IFS 333 and right IFS 334 to couple those structures together during operation.

Figure 4:
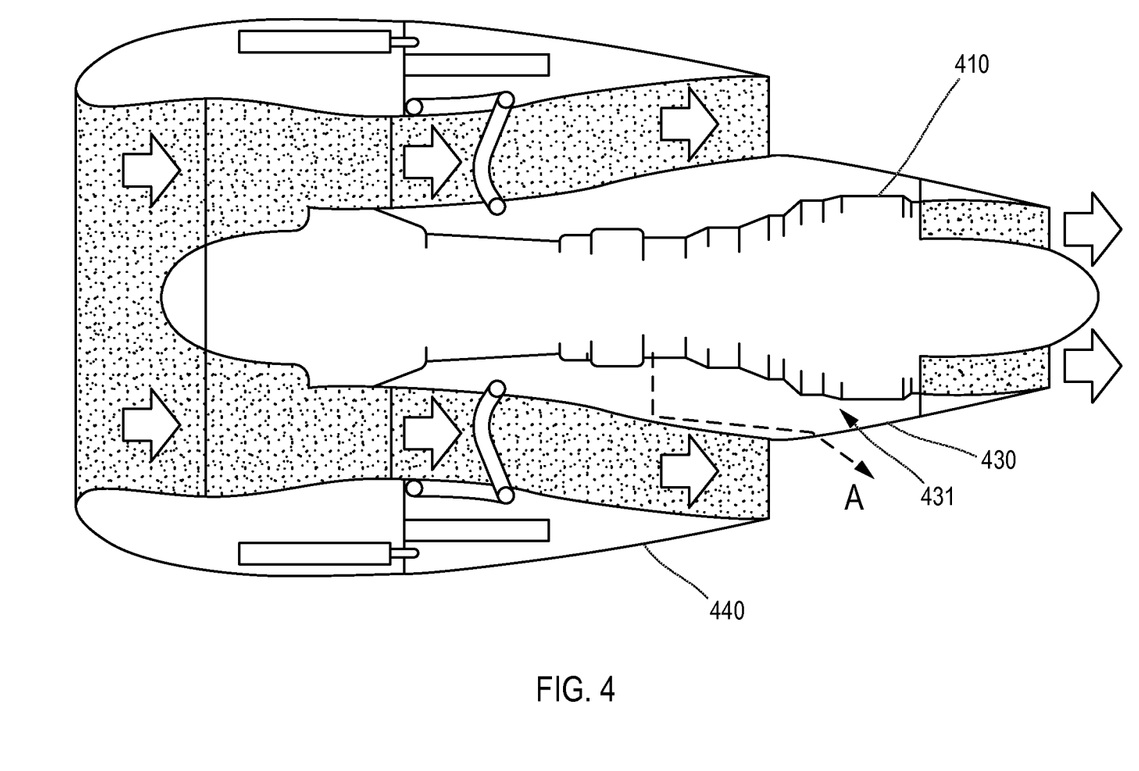
FIG. 4 illustrates a cross-section view of a nacelle with a drain in an IFS in accordance with various embodiments.

Referring to FIG. 4, a cross-section view of a nacelle with a drain in the IFS is schematically illustrated according to various embodiments. As shown by fluid path A, fluids such as jet fuel, oil, hydraulic fluid, etc. may drip from the engine core 410 into the core compartment 431 and onto the interior surface of IFS 430. It may be desirable to remove the fluids from the core compartment to decrease the risk of fire. The fluids may flow through a gutter in an aft direction, and exit the IFS 430 at a station plane aft of the translating sleeve 440 and the exit for the bypass air duct. In various embodiments, the gutter may slope downward in the aft direction, and gravity alone may be sufficient to drain the fluids through the gutter. However, in other embodiments, the aerodynamic shape of the IFS 430 may not facilitate a fluid path A that always flows down hill to take advantage of gravity, and air pressure may be used instead to assist in driving fluids through the gutter, as is described in further detail herein.

Figure 5:
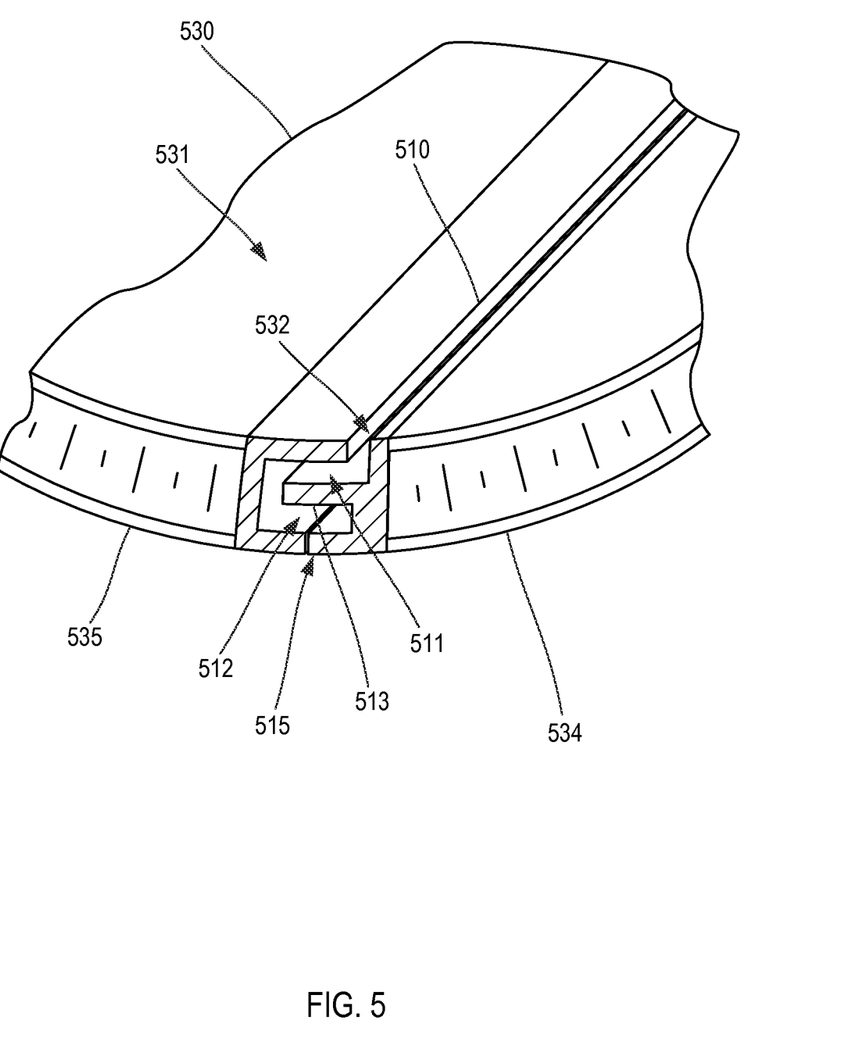
FIG. 5 illustrates a section view of a labyrinth gutter in an IFS in accordance with various embodiments.

Referring to FIG. 5, a schematic section view of a drain gutter in an IFS is illustrated according to various embodiments. The IFS 530 may comprise a gutter which drains fluids in a generally aft direction through the IFS. FIG. 5 illustrates a gutter that optionally includes the principal of a labyrinthian design. Fluids may drip onto an inner surface 531 of the IFS and drain into the labyrinth gutter 510. The labyrinth gutter 510 may comprise an upper channel 511 and a lower channel 512. The upper channel 511 and the lower channel 512 may be separated by a separation platform 513 which extends from one side of the labyrinth gutter 510. Fluids may drip through a separation 532 between the left IFS half 534 and the right IFS half 535. The fluids may drip onto the separation platform 513, then flow off the separation platform into the lower channel 512. Those skilled in the art will recognize that any suitable number of channels may be used in the labyrinth gutter. The labyrinth configuration means that if any fluids in the bottom of the gutter ignite, the flames and hot gases would be required to turn several ninety degree corners in order to reach the core compartment, and these turns will completely or partially prevent flames from reaching the core comparement or blunt their effect and impact if they do. The labyrinth gutter 510 may also optionally include a fire seal 515 adjacent to the lower channel 512 which prevents flames from exiting the labyrinth gutter 510 into the bypass air duct.

Figure 6:
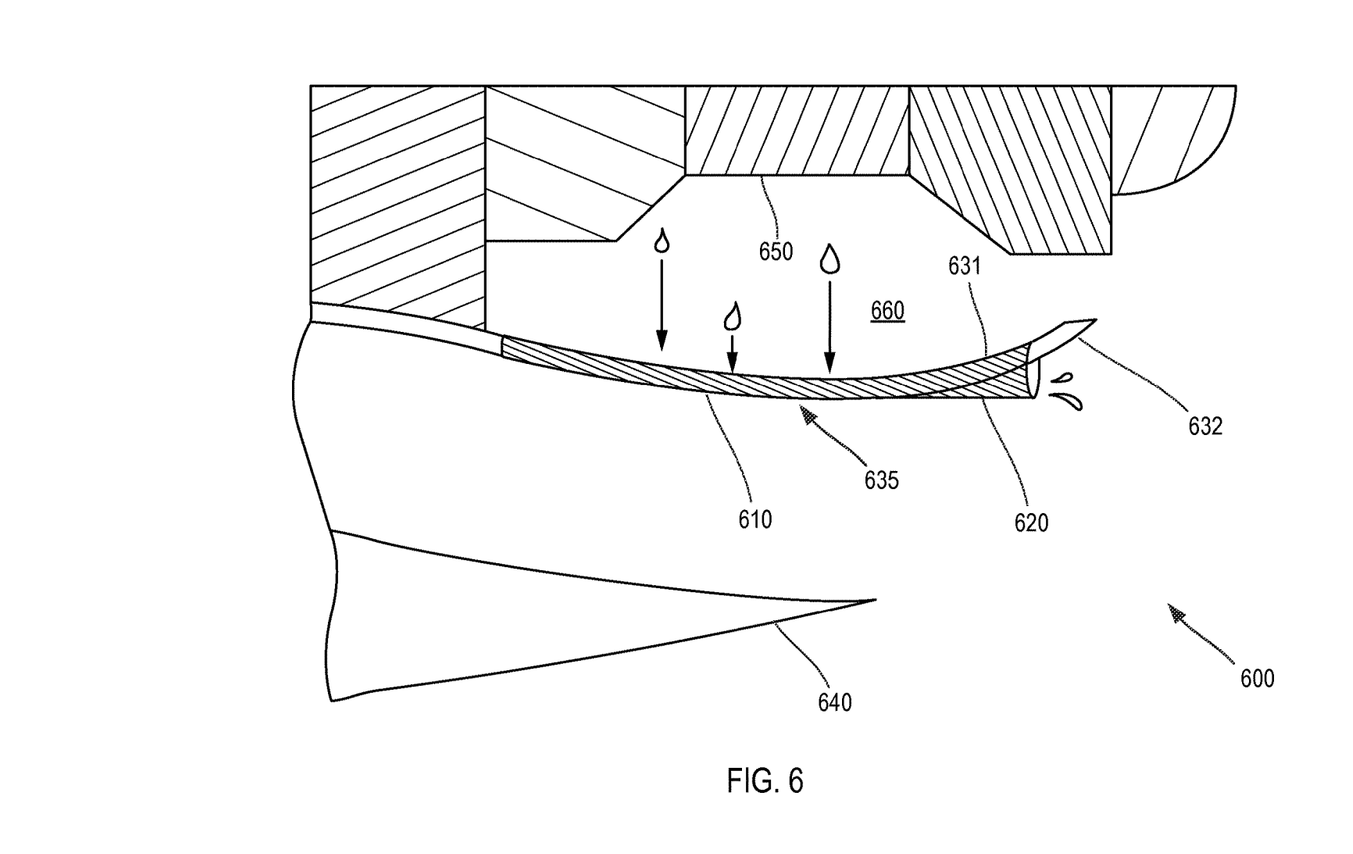
FIG. 6 illustrates a cross-section view of a nacelle with a labyrinth gutter in accordance with various embodiments.

Referring to FIG. 6, a schematic cross-section view of a nacelle 600 with a labyrinth gutter 610 is illustrated according to various embodiments. The labyrinth gutter 610 may comprise a drain fin 620. The drain fin 620 may be coupled to the outer surface 632 of the IFS. Part or all of the drain fin 620 may be located aft of the translating sleeve 640. Fluids may drip from the engine core 650 into the core compartment and onto the inner surface 631 of the IFS, flow in an aft direction through the labyrinth gutter 610, and exit through the drain fin 620. The location of the drain fin 620 aft of the bypass air duct exit and the translating sleeve 640 may prevent fluids exiting the drain fin 620 from dripping onto the translating sleeve 640. A portion of the drain fin 620 may depend from the IFS and may be located at a position of lower gravitational potential energy than a lowest portion 635 of the IFS and may thus help create a fluid pathway that always runs downhill to take advantage of gravity to drain the fluid. The drain fin 620 helps create a continuously downward sloping fluid pathway even when the IFS aerodynamic shaped curves upward at the bypass air exit.

Figure 7:
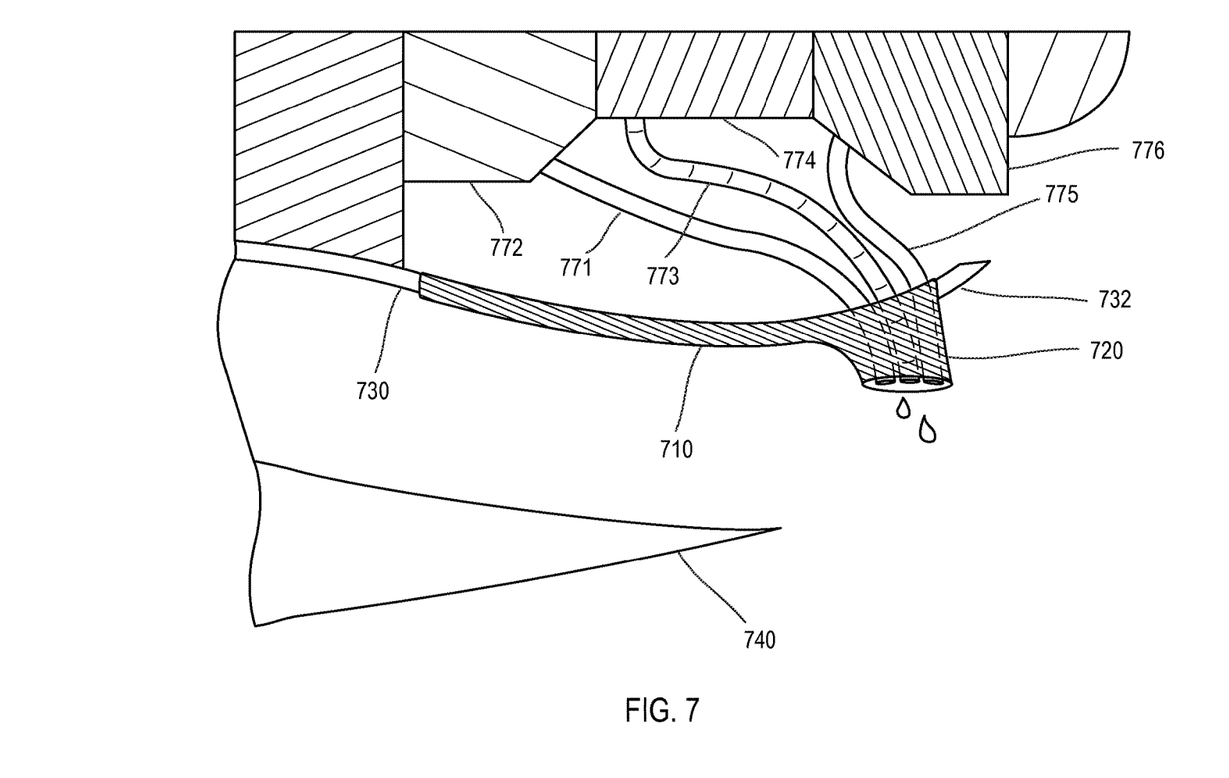
FIG. 7 illustrates a cross-section view of a nacelle having separate drain lines in accordance with various embodiments.

Referring to FIG. 7, a schematic cross-section view of a nacelle comprising separate drain lines is illustrated according to various embodiments. A compressor drain 771 line may drain fluids from the compressor section 772. A combustor drain line 773 may drain fluids from the combustor section 774. A turbine drain line 775 may drain fluids from the combustor section 776. A drain mast 720 may be coupled to the outer surface 732 of the IFS 730. Each drain line may comprise a corresponding exit hole in the drain mast 720. The drain mast 720 may be inspectable, such that maintenance personnel may visually determine which drain line is draining fluid. The drain mast 720 may be located aft of the translating sleeve 740, such that fluids exiting the drain mast 720 do not drip onto the translating sleeve 740. Additionally, fluids which drip onto the IFS 730 may drain through a gutter 710 to the drain mast 720.

Figure 8:
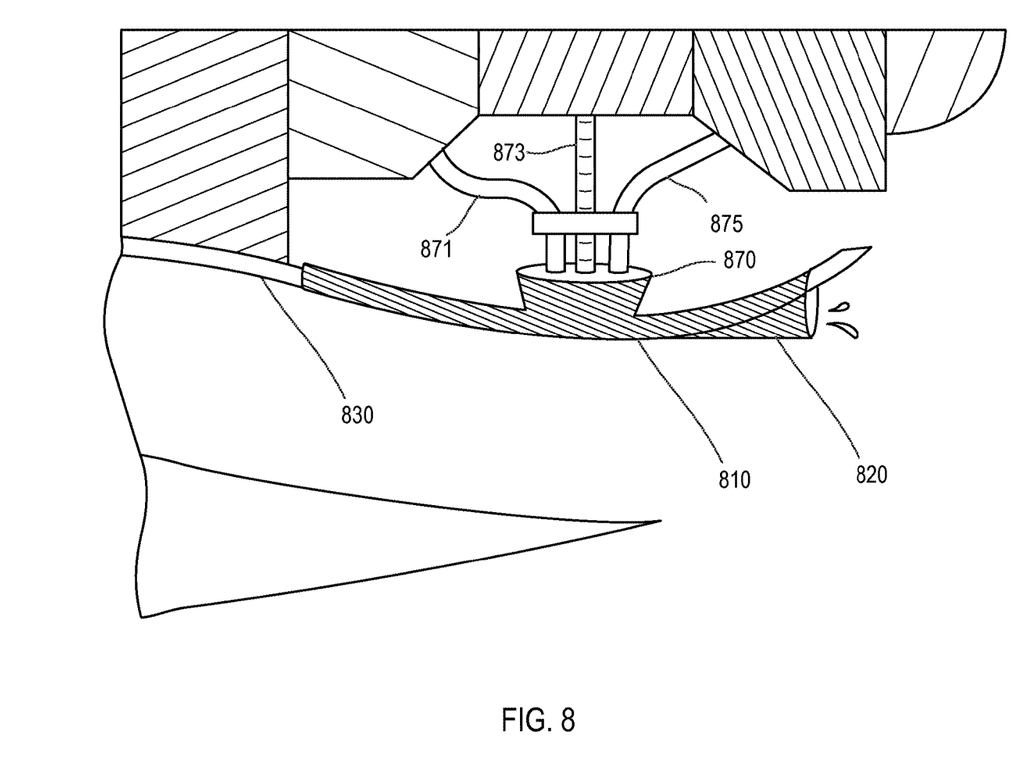
FIG. 8 illustrates a cross-section view of a nacelle having separate drain lines and a labyrinth gutter in accordance with various embodiments.

Referring to FIG. 8, a schematic cross-section view of a nacelle comprising separate drain lines and a labyrinth gutter is illustrated according to various embodiments. The compressor drain line 871, the combustor drain line 873, and the turbine drain line 875 may all drain into a communal collector 870. The collector 870 may be coupled to the IFS 830. The collector 870 may direct the fluids into a labyrinth gutter 810 in the IFS 830. The fluids may flow aft through the labyrinth gutter 810 and exit through a drain fin 820, along with any fluids which drip onto the IFS 830.

Figure 9:
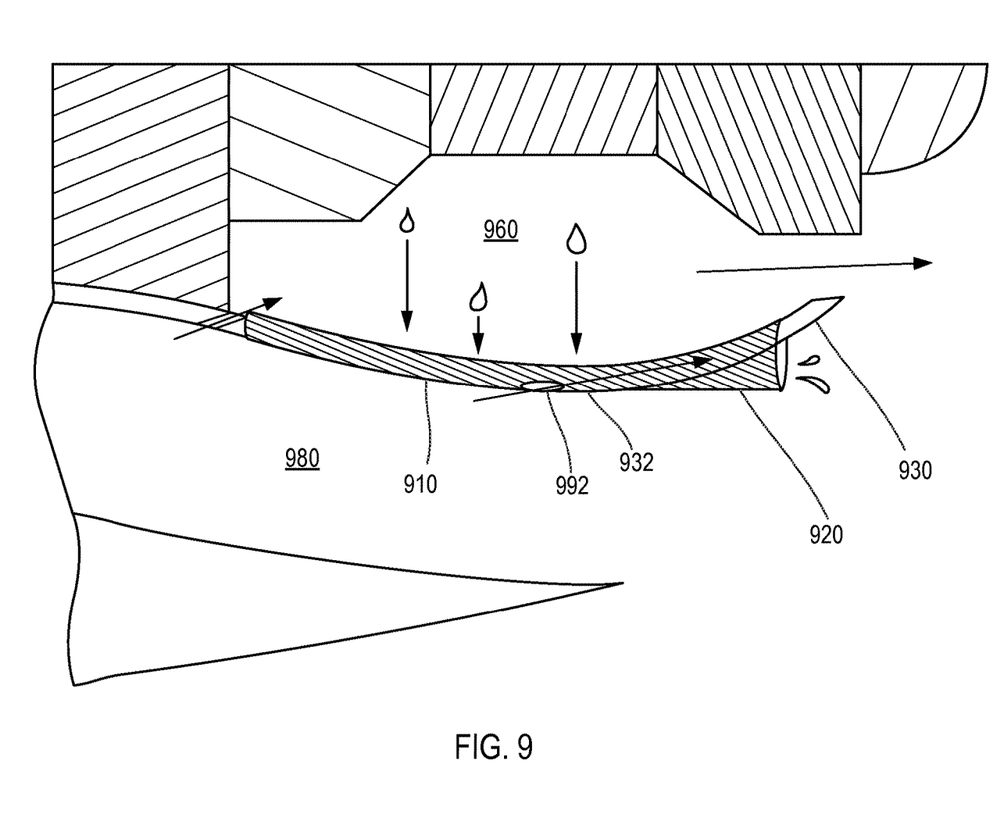
FIG. 9 illustrates a cross-section view of a nacelle showing pressure differentials in accordance with various embodiments.

Referring to FIG. 9, a schematic cross-section view of a nacelle illustrates various embodiments where air flow is used to assist the movement of fluids in the drain. Air in the bypass air duct 980 may be directed into the core compartment 960 in a known fashion. The air may provide cooling to various portions of the engine. The air directed into the core compartment 960 may increase the pressure in the core compartment 960. A portion of the air in the core compartment 960 may exit between the engine case and the IFS 930. However, a portion of the air in the core compartment 960 may travel through the labyrinth gutter 910 and out the drain fin 920 (or other exit structure) due to the higher pressure in the core compartment 960 versus the atmospheric pressure at the location of the drain fin 920. In other embodiments, the IFS 930 may further comprise a siphon. Air in the bypass air duct 980 may enter the siphon through an orifice 992 in the outer surface of the IFS 930. A tube 932 may extend from the orifice 992, through the IFS 930 and aft to the drain fin 920. The tube may connect with the labyrinth gutter 910. The air pressure at the orifice 992 may be greater than the air pressure at the drain fin 920. Thus, air may travel through the siphon in a generally aft direction from the orifice 992 to the drain fin 920. The airflow through the siphon may create a suction which helps pull fluids in the labyrinth gutter 910 out the drain fin 920.

Figure 10:
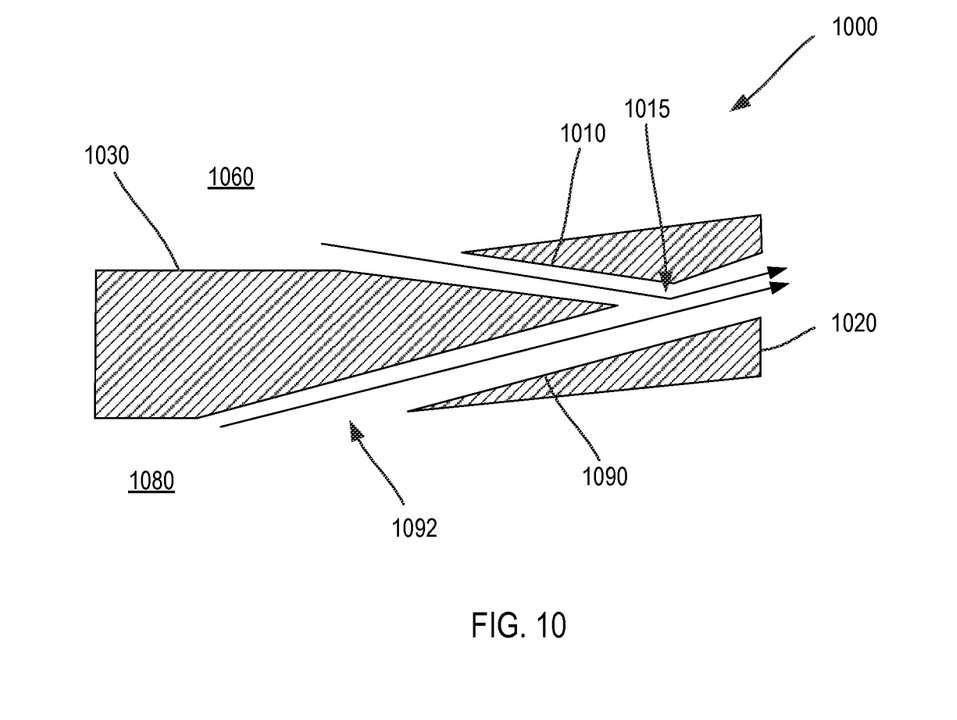
FIG. 10 illustrates an enlarged cross-section view of a siphon in accordance with various embodiments.

Referring to FIG. 10, an enlarged, schematic cross-section view of the siphon 1000 is illustrated according to various embodiments. The siphon 1000 may comprise a tube 1090 extending through the IFS 1030. Air may flow from the bypass air duct 1080, through the orifice 1092, through the tube 1090, and exit out the drain fin 1020. The tube 1090 may be fluidly coupled to the drain gutter 1010. The air flowing through the tube 1090 may create a relatively low pressure at the confluence 1015 between the tube 1090 and the drain gutter 1010. The pressure at the confluence 1015 may be less than the pressure in the core compartment 1060. Thus, air and fluids in the core compartment 1060 may be driven through the drain gutter 1010 and out the drain fin 1020.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

I claim:

1. An aircraft engine nacelle comprising:
   an outer sleeve; and
   an inner fixed structure surrounding a portion of an engine and helping to define a core compartment, the outer sleeve and the inner fixed structure defining between them a bypass air duct;
   the inner fixed structure comprising a gutter, the gutter configured to drain fluids in an aft direction through the inner fixed structure through a gutter outlet located aft of the bypass air duct.

2. The aircraft engine nacelle of claim 1, wherein the gutter comprises a labyrinth structure.

3. The aircraft engine nacelle of claim 1, wherein the gutter comprises a drain fin coupled to an outer surface of the inner fixed structure and located aft of the outer sleeve.

4. The aircraft engine nacelle of claim 1, further comprising a drain fin located at a position of lower gravitational potential energy than the gutter.

5. The aircraft engine nacelle of claim 1, further comprising a fire seal formed by a left half of the inner fixed structure and a right half of the inner fixed structure.

6. The aircraft engine nacelle of claim 1, further comprising a siphon located in the inner fixed structure and comprising an orifice in an outer surface of the inner fixed structure.

7. The aircraft engine nacelle of claim 6, wherein the siphon comprises a tube configured to transfer air from the bypass air duct to an exit of the gutter.

8. A drain gutter for an aircraft nacelle comprising:
   a first semi-annular inner fixed structure ("IFS") half; and
   a second semi-annular IFS half,
      wherein the first IFS half and the second IFS half form a gutter where the first IFS half and the second IFS half couple together.

9. The drain gutter of claim 8, wherein the gutter is a labyrinth gutter comprising an upper channel and a lower channel separated by a separation platform.

10. The drain gutter of claim 9, wherein the first IFS half and the second IFS half form a fire seal adjacent to the lower channel.

11. The drain gutter of claim 9, wherein the labyrinth gutter is configured to prevent ignition of fluids in the lower channel.

12. The drain gutter of claim 8, fu her comprising a vacuum tube fluidly coupled to the gutter.

13. The drain gutter of claim 8, further comprising a drain tin coupled to the first IFS half.

14. The drain gutter of claim 8, further comprising a compressor drain tube, a combustor drain tube, and a turbine drain tube configured to drain fluids into the gutter.

15. An aircraft nacelle comprising:
   an inner fixed structure;
   an outer sleeve; and
   a drain gutter located within the inner fixed structure, wherein the drain gutter comprises a drain fin extending from an underside of the inner fixed structure comprising an outlet positioned aft of the outer sleeve and bypass air duct, wherein the drain gutter is configured to drain fluids in an aft direction through the inner fixed structure to the drain fin.

16. The aircraft nacelle of claim 15, further comprising a siphon in the inner fixed structure.

17. The aircraft nacelle of claim 16, wherein the siphon is fluidly coupled to the drain gutter.

18. The aircraft nacelle of claim 16, wherein the siphon comprises an orifice in an outer surface of the inner fixed structure.

19. The aircraft nacelle of claim 15, further comprising a communal collector configured to receive fluids from at least one of a compressor, a combustor, or a turbine.

20. The aircraft nacelle of claim 15, wherein a fluid path in the drain gutter is configured to be gravitationally downhill when the aircraft nacelle is in level flight.

* * * * *

UNITED STATES PATENT AND TRADEMARK OFFICE
CERTIFICATE OF CORRECTION

PATENT NO. : 10,167,741 B2
APPLICATION NO. : 14/931477
DATED : January 1, 2019
INVENTOR(S) : Anthony Lacko It is certified that error appears in the above-identified patent and that said Letters Patent is hereby corrected as shown below:

In the Claims

In Column 8, Line 24 please delete "fu her" and therefore insert -- further --

Signed and Sealed this
Twelfth Day of March, 2019

Andrei Iancu
*Director of the United States Patent and Trademark Office*